United States Patent [19]

Stubenruss

[11] 4,092,995

[45] June 6, 1978

[54] MULTIPLE VALVE WITH AUTOMATIC SEQUENTIAL OPERATION

[76] Inventor: Paul Stubenruss, Kostlanerweg, 4, Brixen, Prov. Bozen, Italy

[21] Appl. No.: 706,863

[22] Filed: Jul. 19, 1976

[51] Int. Cl.² ............................................. F16K 21/06
[52] U.S. Cl. ...................................... 137/119; 239/66; 137/624.14
[58] Field of Search ............... 137/119, 625.15, 625.16, 137/624.14; 239/66; 251/230

[56] References Cited

U.S. PATENT DOCUMENTS

| | | | |
|---|---|---|---|
| 2,793,908 | 5/1957 | Carver, Jr. | 239/66 |
| 2,964,061 | 12/1960 | Rawson et al. | 251/230 |
| 3,147,770 | 9/1964 | Perlis | 239/66 |
| 3,459,208 | 8/1969 | Clyde | 239/66 |
| 3,533,432 | 10/1970 | Kirby | 137/119 |
| 3,633,621 | 1/1972 | Myers | 137/625.15 |
| 3,635,237 | 1/1972 | Kah, Jr. | 239/66 |
| 3,783,899 | 1/1974 | Fowler et al. | 239/66 |

Primary Examiner—William R. Cline
Assistant Examiner—H. Jay Spiegel
Attorney, Agent, or Firm—Darbo & Vandenburgh

[57] ABSTRACT

The valve of this invention connects a source of water sequentially to separate outlet connections. A piston is moved by the water pressure through a forward stroke which determines the duration of the existing connection. The duration is adjustable by a throttle (one corresponding to each connection) which regulates the speed at which fluid is discharged by the piston. At the end of the timing stroke the piston indexes itself to a new position, moving likewise two selector valve discs, one to make a new outlet connection for the water supply and one to select the corresponding throttle for timing. Also a cycle control valve opens at the end of the timing stroke to let a return spring move the piston through a return stroke.

11 Claims, 14 Drawing Figures

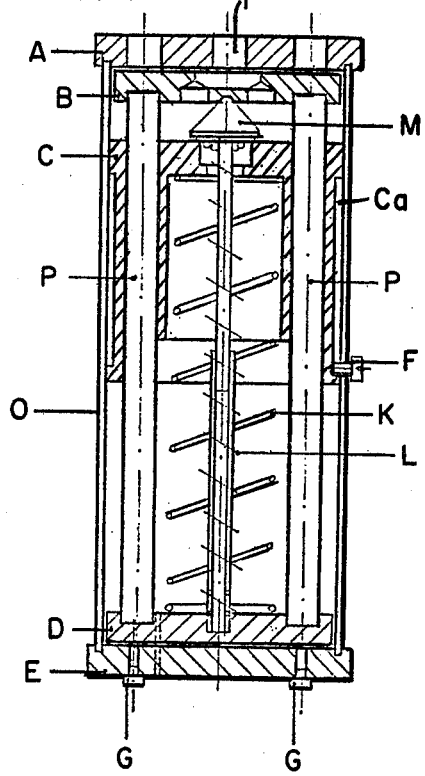
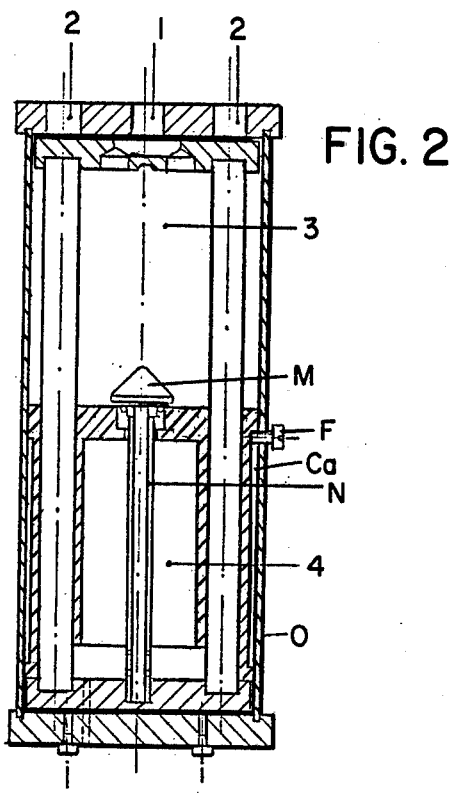
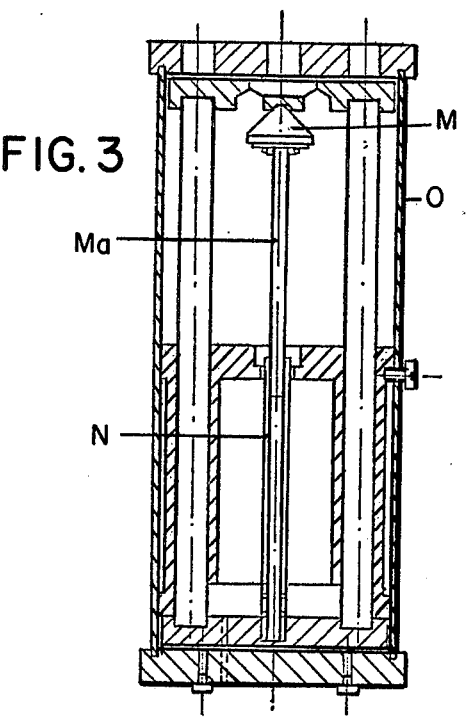
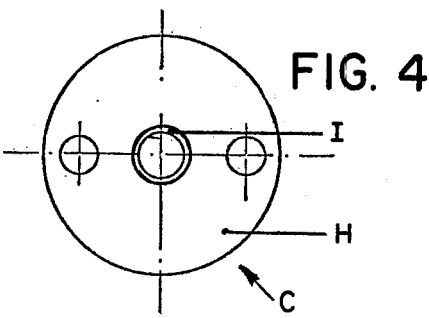
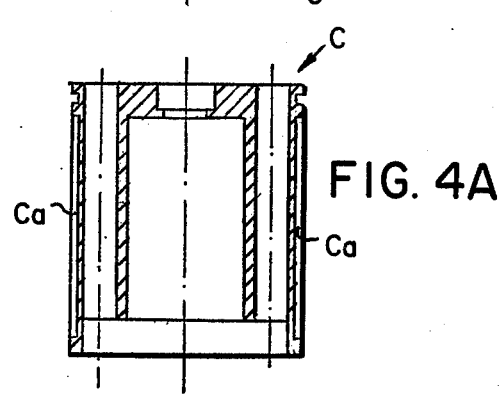

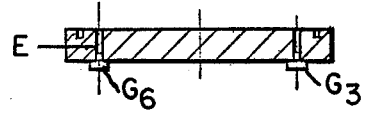
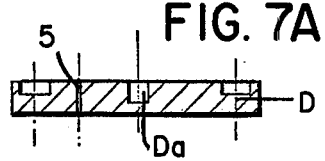
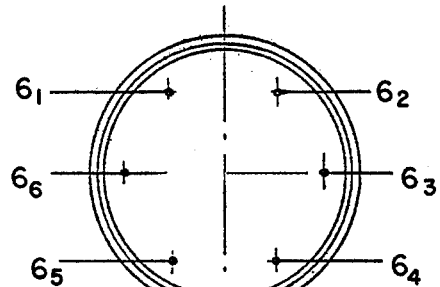
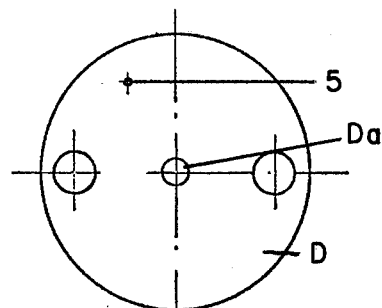
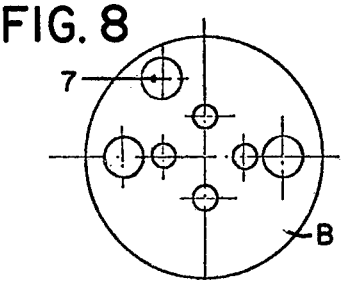
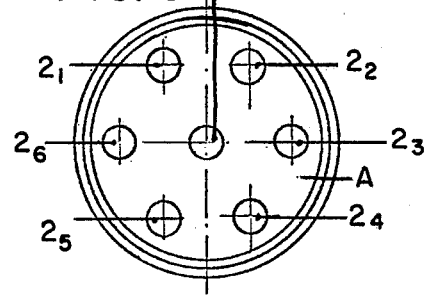
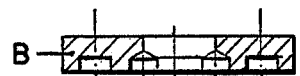
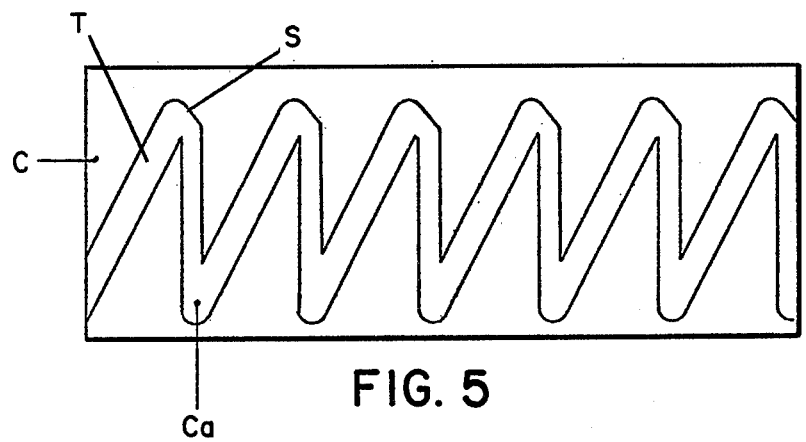

MULTIPLE VALVE WITH AUTOMATIC SEQUENTIAL OPERATION

INTRODUCTION

This invention has for an object to provide a multiple valve with automatic sequential operation. One field of application of such a valve, given by way of example, is that of irrigation systems and especially of irrigation systems for gardens where the available quantity of water is not sufficient for simultaneous operation of all irrigators, or more than one, and therefore it is necessary to provide for a sequential operation of same, that is to say, to make the irrigators operate singly or in groups.

Such a sequential operation of a plurality of irrigators, either singly or in groups, is obtained, prior to this invention, with expensive electronic control apparatus or with clock-mechanisms. The multiple valve according to the present invention solves the problem of sequential operation of irrigators in a simple and functionally safe manner, with much less expense than the known control apparatus.

Besides the control of irrigators, the multiple valve according to this invention can be employed also in other fields of application, as for instance machine tools, which must perform several operations, one after the other.

The embodiment of the invention, as hereafter described and as shown in the annexed drawings, refers to a multiple valve for sequential operation of six irrigators. It can be connected to one feeding duct and to six irrigators.

DESIGNATION OF FIGURES

FIG. 1 shows the multiple valve in longitudinal section, in a starting position;

FIG. 2 is a similar view at the end of a downward stroke of the control piston;

FIG. 3 is a similar view with the valve in an intermediate position during the operation of the first irrigator;

FIGS. 4 to 9A show details of separate parts of the valve, each "A" figure being a sectional view of the part of which a face is shown in the adjacent view; and FIG. 5 being a developed view.

GENERAL DESCRIPTION

The illustrated valve is composed of the following parts:

- A = connector head for six irrigators (FIGS. 9 and 9A);
- B = upper selection disc (FIGS. 8 and 8A);
- C = piston (FIGS. 4 and 4A) with control groove Ca (FIG. 5);
- D = lower selection disc (FIGS. 7 and 7A);
- E = regulator head (FIGS. 6 and 6A);
- F = guide pin running in the control groove Ca of the piston C;
- G = throttling screws forming bleed valves;
- K = spring for the piston C;
- L = spring for the shaft of the cycle-control valve;
- M = valve closure of a cycle-control valve;
- N = guiding tube for the shaft of the cycle-control valve;
- O = external tube;
- P = guide rods for the piston.

The connector head (FIG. 9) has six openings $2_1$ to $2_6$, to which the feeding tubes (not shown) of six irrigators can be connected, and which are to be operated, one after the other, for separately adjustable times, by means of the multiple valve with automatic sequential operation according to the invention.

In the middle of the head A there is the opening 1 for the water supply tube (not shown).

Beginning from the position shown in FIG. 1 as the starting position, the pressure of the water entering through opening 1 acts on the surface H of the piston C; and thus the piston C (together with its closed control valve M) is pushed downwards to the position shown in FIG. 2, since the force which acts on the piston surface H and on the valve head M is greater than the forces of the springs K and L. During this movement, water keeps the expanding chamber 3 filled, and flows through the hole 7 of the upper selection disc B, and through the first connector opening $2_1$ of head A, since these two openings are aligned in the rest position of the multiple valve. It would, however, be possible to set the opening 7 initially for any other of the openings $2_1$ to $2_6$. The speed of the downward movement of the piston C together with the valve closure M from the rest position of FIG. 1 towards the position of FIG. 2, and therefore the duration of the operation of the irrigator connected to opening $2_1$, depends from the exit of the medium (initially air or usually water) from chamber 4. This exit takes place through the single selector opening 5 in the disc D (FIG. 7) and through the hole 6 (FIG. 6) and the adjustable throttle $G_1$ of regulator head E (FIG. 6A) forming a bleed valve for the chamber 4.

Nearly at the end of the downward movement of piston C, a sloping surface S of groove Ca engages guide pin F to nudge the piston C angularly, so that when the piston reverses, guide pin F will follow a sloping part of groove Ca.

At the end of this downward movement of the piston C together with the valve closure M, the shaft Ma of the cycle-control valve is stopped by the middle dead hole Da of the disc D (FIG. 7) and as a consequence the valve closure M is lifted slightly from the seat I (FIG. 4) on the piston, and now the water can enter from chamber 3 into the chamber 4. When the pressure in the chamber 4 approaches the pressure in chamber 3, then the spring L pushes the cycle-control valve M upwards so that it will not close until piston C reaches the end of its return or upward stroke (FIG. 3). At the same time the spring K begins to push the piston C upwards and during this upward movement, the piston is made to rotate about its axis, by an indexing means which comprises the guide pin F running in a sloping leg T of the guide groove Ca in the outer piston wall. The piston completes an angular movement through an angle which corresponds to the angular distance between the openings $2_1$ and $2_2$. When the piston has reached its upper position, the cycle-control valve M closes again against the seat I on the piston and a new cycle, like that described, can begin, but now the irrigator which is connected to opening $2_2$ is operated, since the whole unit consisting of the piston C and the discs B and D, has been rotated through an angle from $2_1$ to $2_2$.

The angular movement of the piston due to the guide pin F running in the groove Ca of the piston is transmitted to the discs B and D through the guide rods P of the piston, so that the opening 7 of the disc B is now aligned with opening $2_2$ of head A, while the opening 5 of disc D is now aligned with hole $6_2$ for throttle $G_2$ of disc E. The disc B along with the head A form a sequencing valve for determining which outlet opening 2 is placed in communication with inlet 1. Similarly the disc D along with regulator head E form a sequencing valve for determining which of the bleed valves G is placed in communication with the chamber 4.

The throttles $G_1$ to $G_6$ can be adjusted for equal or different durations of the cycles they control, so that the duration of operation of the irrigators which are connected to the opening $2_1$ to $2_6$ may be equal or different.

I claim:

1. A valve for controlling the flow of fluid under pressure from an inlet to a plurality of outlets in sequence, said valve comprising:
   a tubular casing having an internal opening about an axis and having two axial ends;
   actuator means within said opening and dividing said opening into two chambers;
   means bearing on the actuator means and urging it to a first position adjacent one of said ends whereby one of said chambers, the one at said one end, is normally small and the other chamber is normally large;
   bleed valve means communicating with said other chamber to permit fluid to be slowly discharged from said other chamber;
   means communicating with said inlet and said one chamber to permit said pressurized fluid to flow into said one chamber whereby the pressurized fluid acts on said actuator means and moves it against the urging of said second mentioned means from said first position and toward the other of said ends to a second position;
   cycle control valve means connected to the actuator means to open said two chambers into communication with each other when said actuator means arrives at said second position and to close said communication between said two chambers when said actuator means returns to said first position, whereby when said two chambers are in communication said second mentioned means will return said actuator means to said first position;
   rotatable sequencing valve means and connected to said inlet and said outlets for placing said outlets sequentially in communication with said inlet depending on the position of the valve means; and
   indexing means for rotating the sequencing valve means as said actuator means moves from said second to said first position.

2. A valve as set forth in claim 1, wherein said casing opening is cylindrical, said actuator means is a piston, and said indexing means interconnects the casing and the piston to index said piston a given angular amount about said axis as said piston moves from said second to said first position and includes a connection between the piston and the sequencing valve means for rotating the latter in response to the rotation of the piston.

3. A valve as set forth in claim 2, wherein said casing has a connector head at said one end, said head having a plurality of openings therethrough and forming said outlets, said openings at said one chamber side of said head being at equal radial distances about said axis, said sequencing valve means including said head and a selection disc, said selection disc being in juxtaposition to said head, being rotatable with respect thereto and having an opening at said radial distance from said axis whereby fluid can flow through the opening in the selection disc from said one chamber to whichever head opening the selection disc opening is in registry with, said selection disc being rotatably connected to said piston so that the disc opening is placed in communication with said head openings sequentially by the rotation of said piston.

4. A valve as set forth in claim 3, wherein said bleed valve means includes a plurality of individual bleed valves corresponding in number to the number of said outlets, and a second sequencing valve means connected to said piston to be positioned by the angular position of the piston about said axis and connected to said bleed valves to sequentially place said bleed valves in communication with said other chamber in response to said angular position of said piston, whereby the length of time required for said piston to travel from said first position to said second position may be separately controlled for each outlet respectively.

5. A valve as set forth in claim 4, wherein said casing has a regulator head at said other end, said regulator head having a plurality of openings therethrough, the last mentioned openings at said other chamber side of said regulator head being at equal given radial distances about said axis, said individual bleed valves being associated with each of said last mentioned openings respectively, said second sequencing valve means including said regulator head and a second selection disc, said second selection disc being in juxtaposition to said regulator head, being rotatable with respect thereto and having an opening at said given radial distance from said axis whereby fluid can flow through the opening in the second selection disc from said other chamber to whichever regulator head opening the second selection disc opening is in registry with, said second selection disc being rotatably connected to said piston so that the disc opening is placed in communication with said regulator head openings sequentially by the rotation of said piston.

6. A valve as set forth in claim 5, including guide rod means connecting said two discs and parallel to and radially offset from said axis, said guide rod means passing through said piston and being journaled therein, said guide rod means forming the rotatable connection between said piston and said discs.

7. A valve as set forth in claim 6, wherein said cycle control valve means comprises:
   said piston having an axially aligned opening and forming a valve seat at the one chamber side of that opening;
   a valve member comprising a valve closure and valve shaft connected together, said valve closure being on said one chamber side of said piston and in juxtaposition to said seat, said shaft extending through said last mentioned opening and being sufficiently long to contact said second selection disc, when said piston is in the second position, to lift said closure away from said seat, said closure contacting the first mentioned selection disc to force said closure against said seat when the piston is in the first position; and
   means engaging said valve member and resiliently urging it in a direction such that the closure is urged away from said seat.

8. A valve as set forth in claim 5, wherein said cycle control valve means comprises:
   said piston having an axially aligned opening and forming a valve seat at the one chamber side of that opening;
   a valve member comprising a valve closure and means for guiding said closure for movement with respect to said seat;

means engaging said valve member and resiliently urging it in a direction such that the closure is urged away from said seat;

means for contacting said valve member when said piston is in the second position to lift said closure away from said seat; and means for contacting said valve member when said piston is in the first position to force said closure against said seat.

9. A valve as set forth in claim 2, wherein said bleed valve means includes a plurality of individual bleed valves corresponding in number to the number of said outlets, and a second sequencing valve means connected to said piston to be positioned by the angular position of the piston about said axis and connected to said bleed valves to sequentially place said bleed valves in communication with said other chamber in response to said angular position of said piston, whereby the length of time required for said piston to travel from said first position to said second position may be separately controlled for each outlet respectively.

10. A valve as set forth in claim 9, wherein said casing has a regulator head at said other end, said regulator head having a plurality of openings therethrough, the last mentioned openings at said other chamber side of said regulator head being at equal radial distances about said axis, said individual bleed valves being associated with each of said last mentioned openings respectively, said second sequencing valve means including said regulator head and a selection disc, said selection disc being in juxtaposition to said regulator head, being rotatable with respect thereto and having an opening at said radial distance from said axis whereby fluid can flow through the opening in the disc from said other chamber to whichever regulator head opening the disc opening is in registry with, said selection disc being rotatably connected to said piston so that the disc opening is placed in communication with said head openings sequentially by the rotation of said piston.

11. A valve as set forth in claim 2, wherein said cycle control valve means comprises:

said piston having an axially aligned opening and forming a valve seat at the one chamber side of that opening;

a valve member comprising a valve closure and means for guiding said closure for movement with respect to said seat;

means engaging said valve member and resiliently urging it in a direction such that the closure is urged away from said seat;

means for contacting said valve member when said piston is in the second position to lift said closure away from said seat; and means for contacting said valve member when said piston is in the first position to force said closure against said seat.

* * * * *